(12) United States Patent
Gmerek, III

(10) Patent No.: US 12,269,940 B1
(45) Date of Patent: Apr. 8, 2025

(54) PELLETIZABLE FIBER BLENDS

(71) Applicant: DOWCO LLC, Akron, OH (US)

(72) Inventor: Michael J. Gmerek, III, Massillon, OH (US)

(73) Assignee: DOWCO LLC, Akron, OH (US)

( * ) Notice: Subject to any disclaimer, the term of this patent is extended or adjusted under 35 U.S.C. 154(b) by 731 days.

(21) Appl. No.: 17/022,667

(22) Filed: Sep. 16, 2020

Related U.S. Application Data

(60) Provisional application No. 62/906,935, filed on Sep. 27, 2019, provisional application No. 62/903,060, filed on Sep. 20, 2019.

(51) Int. Cl.
| | |
|---|---|
| *C08L 23/16* | (2006.01) |
| *C08K 7/02* | (2006.01) |
| *C08L 9/00* | (2006.01) |
| *C08L 9/06* | (2006.01) |
| *C08L 23/08* | (2006.01) |
| *C08L 61/28* | (2006.01) |
| *C08L 77/06* | (2006.01) |
| *C08L 23/0853* | (2025.01) |

(52) U.S. Cl.
CPC ............... *C08L 23/16* (2013.01); *C08K 7/02* (2013.01); *C08L 9/00* (2013.01); *C08L 9/06* (2013.01); *C08L 23/0853* (2013.01); *C08L 61/28* (2013.01); *C08L 77/06* (2013.01); *C08L 2205/025* (2013.01); *C08L 2205/035* (2013.01); *C08L 2207/04* (2013.01)

(58) Field of Classification Search
CPC .... C08L 9/00; C08L 9/06; C08L 23/00; C08L 23/02; C08L 23/0853; C08L 23/04; C08L 23/10; C08L 23/16; C08L 2205/025; C08L 2205/035; C08L 2207/04; C08L 2205/14; C08L 61/28
See application file for complete search history.

(56) References Cited

U.S. PATENT DOCUMENTS

| | | | |
|---|---|---|---|
| 4,244,847 A | 1/1981 | Posiviata et al. | |
| 5,830,395 A | 11/1998 | Vercesi et al. | |
| 8,211,341 B2 | 7/2012 | Lustiger | |
| 9,132,399 B2 | 9/2015 | Walker | |
| 9,353,462 B1 | 5/2016 | Johnson et al. | |
| 2009/0005510 A1* | 1/2009 | Kwitek | C08J 5/046 |
| | | | 525/190 |
| 2012/0208933 A1 | 8/2012 | Hamilton et al. | |
| 2017/0102049 A1* | 4/2017 | Ohno | C08J 11/04 |
| 2018/0327577 A1 | 11/2018 | Cernohous et al. | |
| 2019/0195227 A1 | 6/2019 | Cariveau et al. | |

FOREIGN PATENT DOCUMENTS

| | | | | |
|---|---|---|---|---|
| WO | WO-9424193 A1 * | 10/1994 | ............. | C08J 3/005 |

OTHER PUBLICATIONS

Hofsté, J.M. et al. Polymer Bulletin vol. 36 pp. 213-220 (Year: 1996).*
Kleijnen, R.G. et al. AIP Conference Proceedings vol. 1914 (1) 190002-1 to 190002-5 (Year: 2017).*

* cited by examiner

*Primary Examiner* — Marc S Zimmer
*Assistant Examiner* — Jeffrey S Lenihan
(74) *Attorney, Agent, or Firm* — RENNER KENNER GREIVE BOBAK TAYLOR & WEBER

(57) ABSTRACT

Pelletizable fiber blends are provided, as well as pelletized fibers formed therefrom, and methods of preparing them. The pelletizable fiber blends include short fibers and a binder. The pelletized fiber blend is useful to prepare polymer composites and rubber compositions.

17 Claims, 7 Drawing Sheets
(7 of 7 Drawing Sheet(s) Filed in Color)

PELLETIZABLE FIBER BLENDS

This application claims the benefit of U.S. Provisional Application Ser. No. 62/903,060 filed on Sep. 20, 2019, and U.S. Provisional Application Ser. No. 62/906,935, filed on Sep. 27, 2019, both of which are incorporated herein by reference.

TECHNICAL FIELD

Embodiments of the present invention relate to pelletizable fiber blends, pellets formed therefrom, and methods of preparing them. In one or more embodiments, the invention provides pellets of fiber blends that include fibers and a binding agent.

BACKGROUND OF THE INVENTION

Incorporation of short fibers, flocks, and pulps into mixtures of thermoplastic, thermoset, or crosslinkable polymers significantly alters the physical properties of such compositions which can enhance the performance properties of manufactured parts comprised solely or in-part of such compositions. The effect of the addition of such fibers will vary with the length, type and loading of these fibers. Fibers that have been employed include cotton, polyester, polyamide, polyaramid, cellulose, PTFE, carbon, fiberglass, etc.

The physical dispersion of such fibers is frequently very difficult, often requiring extensive mixing in internal mixers, masticators, extruders, etc. Such extensive mixing breaks down the polymer (polymer chain breakage) effectively lowering the polymer's molecular weight, which is undesirable. There are numerous contributory causes for this dispersion difficulty: increasing surface area with decreasing fiber lengths, electrostatic build-up on many short fibers, moisture content, fiber treatments (if any, such as latexes, bonding agents, sizing, etc.). Clumping of short fibers aggravates this dispersion difficulty. Clumps must be broken up and the individual fibers 'wetted-out' by the polymer-containing compound in order for acceptable fiber dispersion to occur. Some fibers, such as highly fibrillated polyaramids, pose additional problems due to the irregularity of their surfaces.

The industry has attempted to address these problems by pre-blending difficult to disperse fibers with polymeric latexes, wetting agents, surfactants, oils, resins, etc., often as fiber 'master batches,' with limited success. U.S. Pat. No. 4,244,847, incorporated herein by reference, describes the problems of dispersing fibers into rubber with good dispersion, the drawbacks of coagulating latex on the fibers and drying to form pellets, and the effects on the physical properties of fiberized rubber when the fibers are not well dispersed. The '847 patent provides a process for forming a generally dry fiber admix for reinforcing or filling viscoelastomers. Carbon black and oil are used to improve dispersion, and the viscoelastomer must be subjected to high shearing forces so that the fibers are dispersed.

U.S. Pat. No. 9,353,462, which is incorporated herein by reference, describes a fiber blend that includes highly fibrillated aramid fibers and may be more easily dispersed in a polymer matrix.

U.S. Patent Application Publication Nos. 2018/0327577 A1 and 2012/0208933 A1, both of which are incorporated herein by reference, describe methods for preparing highly filled polymer concentrates by melt processing a filler with a liquid polymeric dispersion.

U.S. Patent Application Publication No. 2019/0195227 A1, incorporated herein by reference, describes the problems of dispersing highly fibrillated aramid fibers in rubber compounds with high fiber loading without relying on extended mixing or the use of solid or liquid dispersion agents. Problems cited range from introducing extraneous components to the compound that may adversely affect physical properties to reducing manufacturing economy by requiring additional steps in the process.

Another problem that has traditionally been encountered is the failure of the interfacial bond between the fiber and the rubber compound.

Clearly, a need exists in the art for a fiber blend that will effectively disperse into a polymer composition with minimal mixing, to form a highly filled composite. Improved interfacial bonding between the fibers and the polymer is also desired.

SUMMARY OF THE INVENTION

In one or more embodiments this invention provides a pelletizable fiber blend comprising a plurality of short fibers; and a binder selected from thermoplastic powders, thermoplastic fibers, and elastomeric powders, wherein the pelletizable fiber blend comprises less than about 1 wt. % wax, based upon the total weight of the pelletizable fiber blend.

In one or more embodiments this invention provides fiber pellets comprising the palletizable fiber blend described herein.

In one or more embodiments this invention provides a method of preparing a polymer composite, the method comprising combining one or more polymers and the pelletized fiber blend described herein; and mixing to form a homogenous polymer composite.

In one or more embodiments this invention provides a method of preparing a rubber composition, the method comprising combining, in a first mixing stage, ingredients including one or more vulcanizable polymers and the pelletized fiber blend described herein to form a homogenous vulcanizable polymer mixture, combining the vulcanizable polymer mixture with ingredients including one or more curatives, and at least partially curing the vulcanizable polymer mixture.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF ILLUSTRATED EMBODIMENTS

Figure 1:
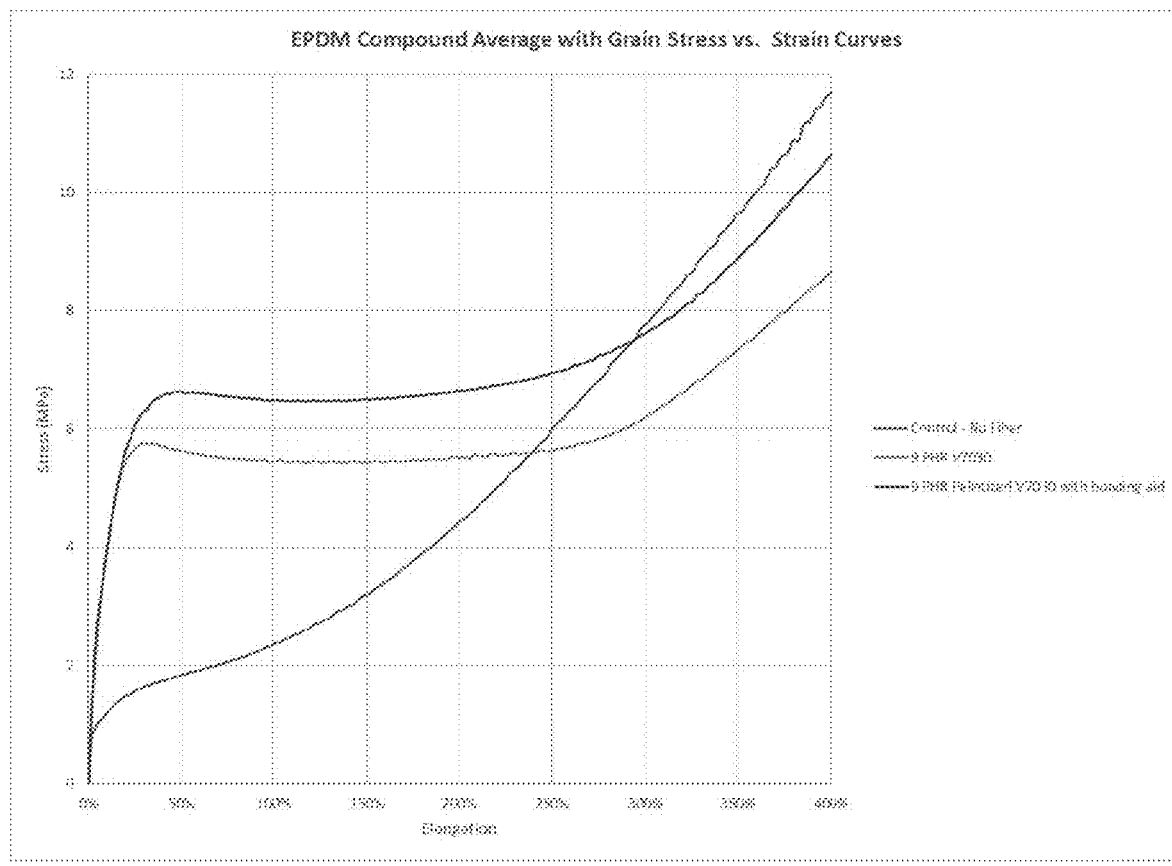
FIG. 1 is a graphical representation of EPDM Compound Average with Grain Stress vs. Strain Curves.

Embodiments of the present invention relate to pelletizable fiber blends, pellets formed therefrom, and methods of preparing them. In one or more embodiments, the invention provides pellets of a fiber blend that includes fibers and a binding agent. In one or more embodiments, the bulk density of the pelletizable fiber blends of the present invention can be increased via palletization, to improve storage, transport, and processing efficiencies.

The fiber blend of the present invention may include fibers made from nylon, cotton, polyester, glass, carbon, aramids, cellulose, and mixtures thereof.

In one or more embodiments, the fiber blends comprise short fibers, and more particularly, the blends comprise highly fibrillated short fibers and non-fibrillated short fibers.

Short aramid fibers generally include fibers of small diameter and high aspect ratio. In one or more embodiments, the short fibers have a length of about 0.1 to about 8 mm (100 to 8000 microns). In one or more embodiments, the short fiber aspect ratio, which is the ratio of length to diameter, is from about 10:1 to about 1000:1, or higher.

In one or more embodiments, the highly fibrillated fibers include aramid fibers. Generally, aramid fibers include manufactured fibers in which the fiber-forming substance is a long-chain synthetic polyamide in which at least about 85% of the amide linkages are directly attached to two aromatic rings.

Aramid fibers include meta-aramids and para-aramids, as further described in U.S. Pat. No. 5,830,395, which is incorporated by reference herein. In one or more embodiments, the aramid fibers include para-aramids, such as polyparapheyleneterephthalamide.

Fibrillation relates to fibers having an irregular shape, sometimes referred to as a branch structure. In one or more embodiments, highly fibrillated fibers are prepared by processing fibers in a manner that partially splits the main fiber such that the fibers that have been split will extend outward from the main fiber. A fiber can also be fibrillated by attaching smaller fibers to a main fiber. Short fibers that are also highly-fibrillated are sometimes referred to as fiber pulp.

In one or more embodiments, the highly-fibrillated aramid fibers may include a coating or other surface treatment. The fibers may be coated, as by epoxy, phenolic, resorcinol-formaldehyde, polyurethane, silicone, plasticizer, or the like, or may be treated with agents that alter handling behavior, adhesion properties, static charge retention, and the like. In other embodiments, the highly fibrillated fibers are devoid of any surface coating.

In one or more embodiments, the highly-fibrillated fibers may be characterized by a degree of fibrillation of at least about 30 percent, in other embodiments, at least about 40 percent, in other embodiments, at least about 50 percent, and in still other embodiments, at least about 55 percent. In one or more embodiments, the highly-fibrillated fibers may be characterized by a degree of fibrillation of from about 30 to about 90 percent.

In one or more embodiments, the highly-fibrillated fibers may be characterized by a specific surface area of from about 4 to about 15.5 square meters per gram ($m^2/g$), in other embodiments, from about 4.5 to about 10.5 $m^2/g$, and in other embodiments, from about 5 to about 8.5 $m^2/g$.

In one or more embodiments, the highly fibrillated fibers have an average length of about 0.1 to about 2.5 mm (100 to 2500 microns), in other embodiments, from about 0.3 to about 2.2 mm, in other embodiments, from about 0.5 to about 2.1 mm, and in other embodiments, from about 0.65 to about 2.0 mm.

In one or more embodiments, the amount of each component of the fiber blend may be expressed as the parts by weight of the component (pbw) per 100 parts by weight of total fiber in the blend (phf). In one or more embodiments, the amount of highly fibrillated fiber in the fiber blend is from about 5 to about 95 pbw phf, based upon the total weight of the fiber blend. In other embodiments, the fiber blend contains from about 10 to about 75 pbw phf, in other embodiments from about 15 to about 60 pbw phf, and in still other embodiments from about 20 to about 50 pbw phf of highly-fibrillated aramid fibers, based upon the total weight of the fiber blend.

In one or more embodiments, the fiber blend comprises short fibers that are non-fibrillated. By non-fibrillated fibers is meant fibers having a relatively low amount of fibrillation, i.e. less than 30%, in one or more embodiments, less than 20%. In one or more embodiments, the non-fibrillated fibers include aramid fibers.

In one or more embodiments, the short fibers have average fiber lengths of from about 50 microns to about 25 millimeters (mm), in other embodiments, from about 75 microns to about 15 mm, and in other embodiments, from about 100 to about 5 mm. In one or more embodiments, the non-fibrillated fibers have average fiber lengths on the order of microns, and may be referred to as micronized fibers. In one or more embodiments, the micronized fibers have an average fiber length of from about 50 microns to about 2000 microns, in other embodiments, from about 100 to about 1,000 microns, in other embodiments, from about 150 to about 750 microns, and in other embodiments, from about 175 to about 500 microns.

In one or more embodiments, the micronized aramid fibers have a specific surface area that is lower than that of the highly fibrillated fibers. In one or more embodiments, the micronized aramid fibers have a specific surface area of from about 0.5 to about 2.5 $m^2/g$, in other embodiments, from about 1 to about 2 $m^2/g$.

In one or more embodiments, the micronized aramid fibers include a coating or other surface treatment. The fibers may be coated, as by epoxy, phenolic, resorcinol-formaldehyde, polyurethane, silicone, plasticizer, or the like, or may be treated with agents that alter handling behavior, adhesion properties, static charge retention, and the like. In other embodiments, the micronized fibers are devoid of any surface coating.

In one or more embodiments, the amount of micronized aramid fibers in the fiber blends of the present invention is from about 5 to about 95 pbw phf, based upon the total weight of the fiber blend. In other embodiments, the fiber blend contains from about 10 to about 85 pbw phf, in other embodiments from about 20 to about 80 pbw phf, and in still other embodiments from about 30 to about 75 pbw phf of micronized aramid fibers, based upon the total weight of the fiber blend.

In one or more embodiments, the fiber blend may optionally further comprise an anti-static agent. An anti-static agent is an additive that is thought to reduce the static charge that builds up when the fibers are produced and whenever they are mixed or further processed. In one or more embodiments, the anti-static agent is a carbon-based anti-static agent. Carbon-based anti-static agents include carbon fibers, pyrolytic graphite, and conductive carbon black. Examples of carbon fibers include PAN carbon fibers, i.e. carbon fibers formed using a polyacrylonitrile (PAN) precursor. Examples of carbon fibers also include milled carbon fibers and pitch-based carbon fibers. In one or more embodiments, the carbon fibers contain at least about 90 wt. % carbon.

In one or more embodiments, the carbon fibers may include a coating or other surface treatment. In other embodiments, the carbon fibers are devoid of any surface coating.

In one or more embodiments, the carbon fibers may be characterized by an average fiber length of from about 50 microns to about 1,000 microns, in other embodiments from about 100 to about 500 microns, and in other embodiments, from about 150 to about 300 microns.

In one or more embodiments, the amount of carbon fibers in the fiber blend of the present invention is from about 0.05 to about 15 pbw phf, based upon the total weight of the fiber blend. In other embodiments, the fiber blend contains from about 0.5 to about 12 pbw phf, in other embodiments from about 1 to about 10 pbw phf, and in still other embodiments from about 2 to about 8 pbw phf of carbon fibers, based upon the total weight of the fiber blend.

Pyrolytic graphite may also be referred to as synthetic graphite or artificial graphite. It is generally characterized as a very high purity carbon material, being composed of about 99 wt. % carbon. Examples of commercially available products include Asbury A99 graphite from Asbury Corp. Conductive carbon black is also commercially available, for example as N472 from Cabot Corp.

In one or more embodiments, the pyrolytic graphite anti-static agent may be present in an amount of from about 0.1 to about 5 pbw phf, based upon the total weight of the fiber blend. In other embodiments, the fiber blend contains from about 0.5 to about 4 pbw phf, in other embodiments from about 0.7 to about 3 pbw phf, and in still other embodiments from about 1 to about 2 pbw phf of a pyrolytic graphite anti-static agent, based upon the total weight of the fiber blend.

In one or more embodiments, the conductive carbon black anti-static agent may be present in an amount of from about 0.1 to about 5 pbw phf, based upon the total weight of the fiber blend. In other embodiments, the fiber blend contains from about 0.5 to about 4 pbwphf, in other embodiments from about 0.7 to about 3 pbw phf, and in still other embodiments from about 1 to about 2 pbw phf of a conductive carbon black anti-static agent, based upon the total weight of the fiber blend.

Combinations of the above carbon-based anti-static agents may be employed. However, in one or more embodiments, the carbon fibers act as an antistatic agent, such that no additional antistatic agents are required. In these or other embodiments, the amount of antistatic agent other than the carbon fibers may be less than about 0.5 pbw phf, in other embodiments, less than about 0.1 pbw phf, based upon the total weight of the fiber blend. In one or more embodiments, the fiber blend is devoid of antistatic agents other than the carbon fibers.

In one or more embodiments of the present invention, the fiber blend may include one or more binding agents. In one or more embodiments of the present invention, the binding agent binds the fibers to form cohesive pellets. A separate melting or heat processing step is not required.

In one or more embodiments, the binder is characterized by a melt temperature that is lower than the melt temperature of the fibers in the fiber blend. In one or more embodiments, the binder is characterized by a melt temperature that is similar to the melt temperature of the matrix to which the fiber blend is intended to be added. In one or more embodiments, the binder has a softening point that is greater than 86° C., and in other embodiments, great than 90° C.

In one or more embodiments of the present invention, the binding agent is selected from powdered or fibrous thermoplastic or elastomeric polymer. Examples of binding agents include nylon powder, nylon fiber, polybutadiene powder, polyolefin powder or fiber, including polypropylene powder, polypropylene fiber, polyethylene powder, polyethylene fiber, EPDM rubber powder, styrene-butadiene rubber powder, ethylene-vinyl acetate (EVA) powder, silane powder, maleinized polybutadiene, and hexakis(methoxymethyl) melamine (HMMM) resin powder.

Advantageously, the binding agent provides cohesiveness to the fiber blend, such that the fiber blend many be easily pelletized, and such that the pellets will retain their integrity without falling apart during shipping and receiving, and during transport and loading in processing facilities. Also advantageously, when the pelletized fiber blend is employed in thermoplastic or elastomeric polymer composites, the pellets easily break apart during mixing or compounding.

In one or more embodiments, the binding agent is selected for compatibility, e.g. miscibility, with the intended thermoplastic or elastomeric base matrix. In one or more embodiments, the binding agent improves the interfacial bond between the fiber and the thermoplastic or elastomeric polymer in the base matrix.

In one or more embodiments, the pelletizable fiber blend includes at least about 5 wt. %, in other embodiments, at least about 7 wt. %, in other embodiments, at least about 10 wt. %, in other embodiments, at least about 12 wt. %, in other embodiments, at least about 15 wt. %, and in other embodiments, at least about 17 wt. % binder, based upon the total weight of the pelletizable fiber blend. In one or more embodiments, the pelletizable fiber blend includes up to about 95 wt. %, in other embodiments, up to about 93 wt. %, in other embodiments, up to about 90 wt. %, in other embodiments, up to about 87 wt. %, in other embodiments, up to about 85 wt. %, and in other embodiments, up to about 80 wt. % binder, based upon the total weight of the pelletizable fiber blend. In one or more embodiments, the pelletizable fiber blend includes up to about 45 wt. %, in other embodiments, up to about 40 wt. %, in other embodiments, up to about 35 wt. %, in other embodiments, up to about 30 wt. %, in other embodiments, up to about 25 wt. %, in other embodiments, up to about 22 wt. % binder, and in other embodiments, up to about 18 wt. % binder, based upon the total weight of the pelletizable fiber blend.

In one or more embodiments of the present invention, the fiber blend may include one or more optional ingredients. Examples of optional components include additives such as processing modifiers, partitioning agents, anti-static enhancers, and performance enhancers. More specific examples of optional additives include waxes, fatty acids, fatty acid esters, processing oils, soaps, homogenizing agents, silica, pyrolytic graphite, conductive carbon black, powdered polytetrafluoroethylene (PTFE), silane coupling agents, bonding resins, low molecular weight polymers, and friction modifiers.

In one or more embodiments, the fiber blend includes from 0 to about 10 pbw phf of silica. In these or other embodiments, the fiber blend includes from 0 to about 5 pbw phf of pyrolytic graphite. In these or other embodiments, the fiber blend includes from 0 to about 5 pbw phf of conductive carbon black. In these or other embodiments, the fiber blend includes from 0 to about 50 pbw phf of PTFE.

In one or more embodiments, the fiber blend may optionally include one or more partitioning agents. Partitioning agents include additives that aid in fiber separation and dispersion. In one or more embodiments, the partitioning agent inhibits caking and clumping of the fiber blend and promotes flowability in dry fiber blends.

Examples of partitioning agents include silica fillers such as synthetic, fumed silica. In one or more embodiments, the silica may be characterized by a surface area of about 200 square meters per gram ($m^2/g$). In one or more embodiments, the silica may be characterized by a particle size such that about 99.9% of the particles pass through a 325 mesh (44 micron) screen in a sieve residue test. In one or more embodiments, for a given volume of silica, about 94% of the volume is void volume, i.e. air. Examples of commercially available silica includes Cabosil, available from Cabot.

In one or more embodiments, the partitioning agent may be present in an amount of from about 0.1 to about 5 pbw phf, based upon the total weight of the fiber blend. In other embodiments, the fiber blend contains from about 0.5 to about 4 pbw phf, in other embodiments from about 0.7 to about 3 pbw phf, and in still other embodiments from about 1 to about 2 pbw phf of a partitioning agent, based upon the total weight of the fiber blend.

In one or more embodiments, the micronized fibers and/or the carbon fibers act as partitioning agents for the highly fibrillated fibers, such that no additional partitioning agents are required. In these or other embodiments, the amount of partitioning agent may be less than about 0.5 pbw phf, in other embodiments, less than about 0.1 pbw phf, based upon the total weight of the fiber blend. In one or more embodiments, the fiber blend is devoid of partitioning agents other than the micronized fibers and the carbon fibers.

Oils, waxes, and other coatings are not required for forming pellets from the pelletizable fiber blend. This is advantageous, for example, because oils, waxes, and other components that have conventionally used as binders for fiber blends can have a deleterious effect on the properties of the composite material to which the fiber blends are added. In one or more embodiments, the pelletizable fiber blend of the present invention includes less than about 1 wt. % wax, in other embodiments, less than about 0.5 wt. % wax, and in other embodiments, less than about 0.1 wt % wax, based upon the total weight of the pelletizable fiber blend. In one or more embodiments, the pelletizable fiber blend is devoid of wax. In one or more embodiments, the pelletizable fiber blend of the present invention includes less than about 1 wt. % oil, in other embodiments, less than about 0.5 wt. % oil, and in other embodiments, less than about 0.1 wt. % oil, based upon the total weight of the pelletizable fiber blend. In one or more embodiments, the pelletizable fiber blend is devoid of oil.

In one or more embodiments, the amount of micronized fibers in the fiber blend may be selected relative to the amount of highly-fibrillated fibers in the fiber blend. In one or more embodiments, including embodiments wherein carbon fibers are employed, the combined amount of micronized fibers and carbon fibers may be selected relative to the amount of highly-fibrillated fibers in the fiber blend.

In one or more embodiments, the amount of highly-fibrillated fibers and micronized fibers may be expressed as a ratio, based upon weight. In one or more embodiments, the weight ratio of highly-fibrillated fibers to micronized fibers is from about 1:0.25 to about 1:20, in other embodiments, the ratio is from about 1:0.5 to about 1:5.

In one or more embodiments, the weight ratio of highly-fibrillated fibers to micronized fibers is from about 1:0.3 to about 1:25, in other embodiments, the ratio is from about 1:0.5 to about 1:10.

In one or more embodiments, the amount of highly fibrillated fibers relative to the amount of carbon fibers, on a weight ratio basis (weight of highly fibrillated fibers:weight of carbon fibers), is from about 1:0 to about 1:3.

In one or more embodiments, the total amount of aramid fibers (including both highly fibrillated and non-fibrillated) relative to the amount of carbon fibers, on a weight ratio basis (weight of aramid fibers:weight of carbon fibers), is from about 1:0.01 to about 1:0.2.

In one or more embodiments, the total amount of aramid fibers (including both highly fibrillated and non-fibrillated) relative to the amount of binder, on a weight ratio basis (weight of aramid fibers:weight of binder), is from about 1:0.1 to about 1:4, in other embodiments, from about 1:0.2 to about 1:0.5.

Advantageously, the pelletizable fiber blends of the present invention enable proportionately higher amounts of fibers to be homogenously dispersed into polymer compositions.

In one or more embodiments, the fibers, binding agent, and, optionally, other ingredients, are mixed together using standard fiber mixing techniques.

In one or more embodiments, the blend may be pelletized using a pellet mill. The type of pellet mill is not necessarily limited. Flat die and ring die pellet mills can be employed. Pellet mills are commercially available, for example from Pellet Masters.

The size of the pellets is not necessarily limited. In one or more embodiments, the pelletizable fiber blend is run through a die having a hole size of 3 millimeters (mm), in other embodiments, 4 mm, in other embodiments, 6 mm.

In one or more embodiments, the pellets retain their integrity without falling apart during shipping and receiving, and during transport and loading in processing facilities. Also advantageously, when the pelletized fiber blend is employed in thermoplastic or elastomeric polymer composites, the pellets easily break apart during mixing or compounding. For example, in one or more embodiments, where the pelletized fiber blend is combined with thermoplastic polymer and processed in a twin-screw extruder, the pellets disintegrate in the extruder, leading to a homogeneous dispersion of the fiber blend throughout the thermoplastic polymer. In other embodiments, where the pelletized fiber blend is combined with elastomeric polymer and processed in a mixer such as a Brabender mixer, the pellets disintegrate in the mixer, leading to a homogeneous dispersion of the fiber blend throughout the elastomeric polymer. In one or more embodiments, the pellets disintegrate due to the melting of the binder.

The pelletized fiber blend has a higher bulk density than the unpelletized fiber blend. This leads to more efficiencies in storage and transportation. In one or more embodiments, the pelletized fiber blend has a bulk density that is about 10 times greater than the bulk density of the unpelletized fiber blend, and in other embodiments, the pelletized fiber blend has a bulk density that is about 15 times greater than the bulk density of the unpelletized fiber blend.

In a continuous process such as twin screw extrusion, pellets are easier to add than a low bulk density fiber. The pelletized fiber blend of the present invention leads to a more consistent end product. Batch mixing of elastomic compounds, for example in a bradender, mixer, is also benefited by the pelletized fiber blend of the present invention. Unpelletized fibers occupy 10 to 15 times the volume of the pelletized fiber blend, and therefore larger batches can be prepared with pellets than with unpelletized fiber.

Pelletized fiber blends of the present invention can be used in a variety of polymer compositions comprising thermoplastics, thermosets, or crosslinkable polymers. In one or more embodiments, the polymer may be a thermoplastic or thermoset polymer or combinations thereof.

Examples of suitable polymers include vulcanizable polymers, such as natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber (TM), urethane rubber, silicone rubber, epichlorohydrin rubber, copolymers of ethylene oxide and chloromethyloxirane (ECO), fluoroelastomers, chlorosulfonated polyethylene (CSM), chloropolyethylene, styrene-chloroprene, ethylene-propylene rubber (EPM), ethylene-propylene-diene terpolymer (EPDM), acrylate-butadiene rubber (ABR), acrylic rubber (ACM), nitroso rubber (AFMU), ethylacrylate-acrylonitrile rubber (ANM), alkylene sulfide rubber (ASR), urethane rubber based on polyester (AU), urethane rubber based on polyether (EU), bromobutyl rubber (BIIR), chlorobutyl rubber (CIIR), hydrogenated acrylonitrile-butadiene rubber, and mixtures thereof. In one or more embodiments, the polymer includes EPDM.

Further examples of suitable polymers include polyethylene, polypropylene, polyvinyl chloride, polystyrene, epichlorohydrin-ethyleneoxide terpolymer, ethylene-propylene copolymer, ethylene-vinylacetate copolymer (EVM), tetrafluoroethylene (TFE), acrylonitrile, and acrylonitrile-butadiene-styrene copolymer, and other copolymers and terpolymers thereof.

Thus, the present invention provides a method of preparing a polymer composite, the method comprising the steps of combining one or more polymers, a pelletized fiber blend comprising highly fibrillated fibers, non-fibrillated fibers, carbon fibers, and a binder, and mixing to break apart the pellets, thereby dispersing the fibers throughout the polymer and forming a homogenous polymer composite, wherein the pelletized fiber blend is added directly to the polymers without melting the pellets or performing any additional pre-processing steps.

In one or more embodiments, the polymer composite may further include one or more optional ingredients, including fillers, processing oils, plasticizers, antidegradants, inhibitors, accelerators, catalysts, colorants, and the like.

In one or more embodiments, the pelletized fiber blend is added in the amount such that the amount of fibers in the polymer composite will be in the range of from about 2 to about 40 pbw per 100 parts by weight polymer (php). In other embodiments, the amount of fiber blend employed in thermoplastic compositions could be much higher. In one or more embodiments, the pelletized fiber blend is added to the polymer in a single mixing step, and in a single mixer. Pre-mixed concentrates of polymer and fiber are not required in order to obtain good dispersion.

The present invention further provides a method of preparing a rubber composition. The method includes the step of combining, in a first mixing stage, ingredients including one or more vulcanizable polymers and the pelletized fiber blend comprising highly fibrillated fibers, non-fibrillated fibers, carbon fibers, and a binder, and mixing to break apart the pellets, thereby dispersing the fibers throughout the polymer and forming a homogenous vulcanizable polymer mixture, wherein the pelletized fiber blend is added directly to the polymers without melting the pellets or performing any additional pre-processing steps. The vulcanizable polymer mixture is combined with ingredients including one or more curatives, and then cured.

In one or more embodiments, the curative may include sulfur, peroxide, metallic oxide, urethane crosslinkers, acetoxysilane, or mixtures thereof. In one or more embodiments, the rubber composition may further comprise one or more optional ingredients, including carbon black, silica, accelerants, activators, antidegradants, retarders, processing oils, and the like.

Advantageously, embodiments of the present invention provide a homogeneous, intimate blend of a plurality of types of fibers, each capable of contributing to the overall properties of the fiber blend. In one or more embodiments, the homogeneity of the fiber blend is visually detectable. For example, stratification or layering of the fibers is not observed in homogeneous blends. In one or more embodiments, the homogeneity of a blend can be determined by employing a separation analysis based on density differences among the fibers. Examples of separation tests that may be employed include static, aged, and shaken tests typically conducted for fiber mixtures, as well as a modified ASTM Sieve residue test with selected screens to establish the persistence of the blend.

In one or more embodiments, the pelletized fiber blends of the present invention have improved dispersion into polymer compositions. This improved dispersion results in a reduction in the mixing time and/or in the number of passes that are normally required in order to produce a homogeneous polymer composite and good dispersion of the fibers. Reduced mixing time can result in less polymer degradation. Improved dispersion of the fibers throughout the polymer composite can result in less waste and more consistent properties from batch to batch.

In one or more embodiments, the pelletized fiber blends of the present invention have a reduced tendency of fibers to develop a static charge during processing. In one or more embodiments, the pelletized fiber blends of the present invention have a reduced tendency of the fibers to clump together during mixing and/or storage.

In one or more embodiments, thermoplastic or elastomeric composite compositions comprising the pelletized fiber blend of the invention have properties that are equivalent to or improved over the same compositions, but where the fibers were added as an unpelletized blend, or where the fibers were added individually. In one or more embodiments, polymer composites produced according to the methods of the present invention have increased strength and improved mechanical properties.

In one or more embodiments, elastomeric composite compositions comprising the pelletized fiber blend of the invention are characterized by improvement in one or more material physical properties, including tensile modulus, elongation, ultimate tensile, tear strength, and abrasion resistance: (a) when compared to the elastomeric composition without fibers, and also (b) when compared to the elastomeric composition containing the same fibers, but added as unpelletized pulp and without the binding agent.

In one or more embodiments, because the pelletized fiber blend does not include wax or other extraneous components that may be detrimental to the overall composite, the amount of fiber in the composite can be increased.

In one or more embodiments, because the pelletized fiber blend can be added directly to the polymer, the amount of fiber in the composite may be easily selected for an optimal balance of desired properties. In one or more embodiments, the simplicity and flexibility of the present methods makes it possible to more readily optimize a polymer composite, including the specific gravity, density, and bulk density of the fiber blend within the composite, to achieve specific properties within the final polymer blend.

The polymer compositions prepared according to the present invention may be employed a wide variety of products, including belts, hoses, MRG parts (mechanical rubber goods), wear pads, brake components, track and tread pads, such as for tanks and caterpillar type tracks, tire components, such as rim strips, bead fillers, and the like.

EXAMPLES

A comparison was made between the Control Sample—EPDM-based rubber formulation, Sample A—the same EPDM-based rubber formulation as the Control, but containing Varamix® V7030 aramid pulp blend, and Sample B—the same EPDM-based rubber formulation as Sample A, but containing Varamix® V7030 aramid pulp blend, where the fiber blend was first pelletized according to the present invention. Varamix® V7030 is available from Finite Fiber, Akron, Ohio.

TABLE 1

| Material | Description | PHR Control | Sample A | Sample B |
|---|---|---|---|---|
| ROYALENE 580 HT | EPDM | 85 | 85 | 85 |
| TRILENE 77 | EPDM | 15 | 15 | 15 |
| V7030 | V7030 aramid blend | 0 | 9 | |
| V7030BA2P | V7030 pellet with bonding aid | | | 11.2 |
| SUNPAR 2280 | PROC AID | 5.0 | 5.0 | 5.0 |
| N326 | C BLACK | 68 | 42 | 42 |
| ZINC OXIDE | ACTIVATOR | 3.1 | 3.1 | 3.1 |
| AGERITE RESIN D | AO | 1.0 | 1.0 | 1.0 |
| ZMTI | AO | 0.5 | 0.5 | 0.5 |
| ZINC STEARATE | PROC AID | 1.5 | 1.5 | 1.5 |
| SR 521 | CO-AGENT | 2.75 | 2.75 | 2.75 |
| *SULFUR | CURATIVE | 0.25 | 0.25 | 0.25 |
| *DI-CUP 40 KE | CURATIVE | 7.0 | 7.0 | 7.0 |
| TOTALS | | 189.1 | 172.1 | 174.3 |

It should be noted that when the aramid fiber blend is added, the amount of carbon black is reduced versus the control formulation. In this case, for every 1 phr of aramid fiber blend added the N326 carbon black was reduced by 2.9 phr. This is adjusted so that the hardness remains relatively close to the control. Also, Sample B contains the pelletized version of the aramid blend with 20% by weight binding agent. The pelletized fiber blend was added at 11.2 phr to keep the fiber loading the same as Sample A (9 phr).

The compounds were mixed using a three-pass mix on a tangential lab mixer. All components were added in the first pass and dumped at a temperature of approximately 93° C. The second pass was dumped at approximately 105° C. The curative was added during the final pass and dumped at approximately 96° C. The rubber was sheeted out on a mill to orient the fibers in the grain direction.

Table 2 summarizes key process parameters. The slight change in rheological properties may be attributed to substituting the aramid fiber for the N326 carbon black. The overall filler content is reduced with this substitution.

TABLE 2

| | Mooney 100 C (ASTM D1646) | | | MDR 30 min @ 160 C ASTM D5289 | |
|---|---|---|---|---|---|
| Sample | Initial (MU) | Final (MU) | ML(1 + 4) MU | Scorch Time TS1(min) | TC 90 (min) |
| Control | 80.4 | 58.9 | 59.9 | 0.94 | 16.6 |
| Sample A | 84.1 | 48.0 | 48.8 | 1.2 | 17.6 |
| Sample B | 80.4 | 49.0 | 49.9 | 1.16 | 18.7 |

Test samples were molded in both the grain and cross grain directions and physical properties were measured. Results of Durometer Hardness Type A, Tear Strength, Compression Set, and Drum Abrasion as shown in tabular form in Table 3, and shown graphically in the Figures.

Figure 2:
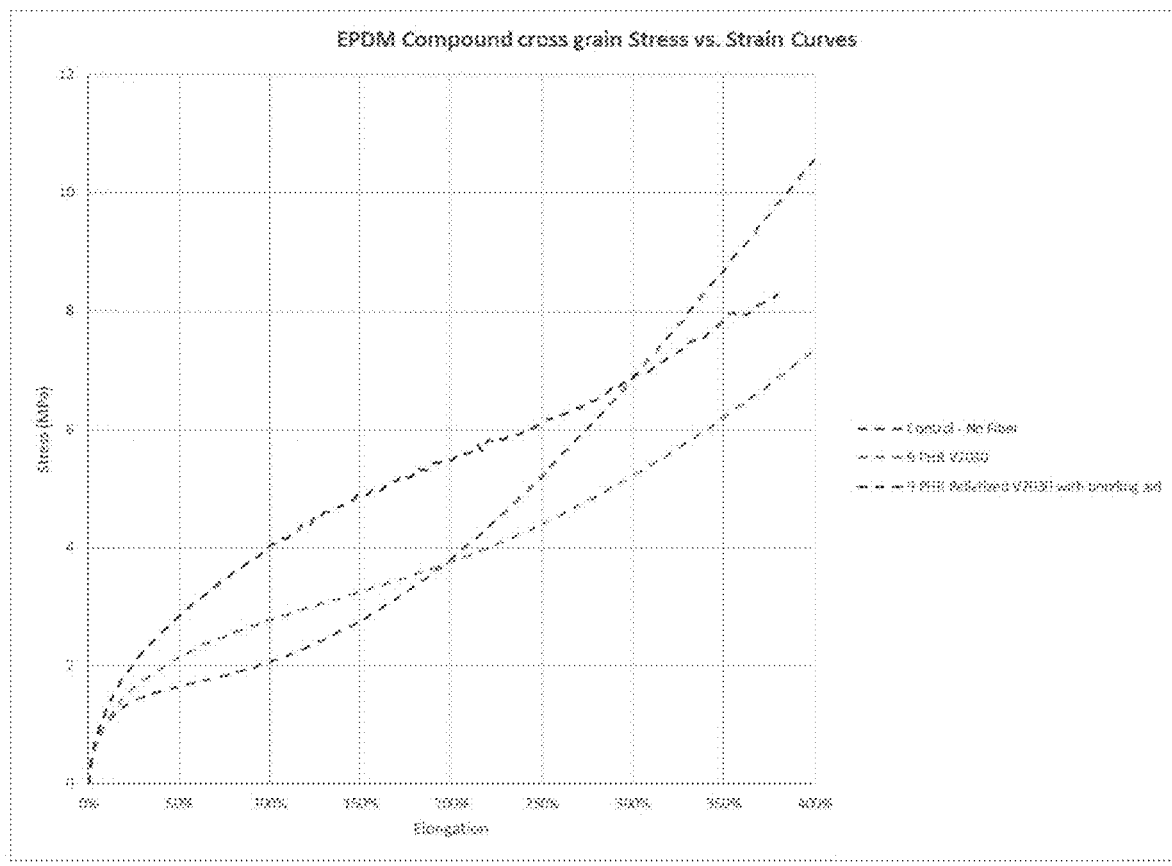
FIG. 2 is a graphical representation of EPDM Compound Average with Cross Grain Stress vs. Strain Curves.

The stress vs strain curves in the grain and cross grain directions are shown in FIGS. 1 and 2. FIG. 1 shows that the aramid pulp loaded EPDM compounds gain a significant amount of tensile modulus in the grain or fiber oriented direction in the low strain region (~20-30% strain). The yield point, where the curve transitions to an almost horizontal line, increases in sample B vs. Sample A. This shows the positive effect of the binding agent on the fiber to rubber interface. In a fiber loaded rubber compound, the yield point is where the interfacial bond between the fiber and the rubber begins to fail. The cross-grain plot in FIG. 2 shows similar positive results with the pelletized fiber blend (Sample B), but since it is being pulled perpendicular to the fiber orientation, the large gain in tensile modulus in not seen.

Figure 3:
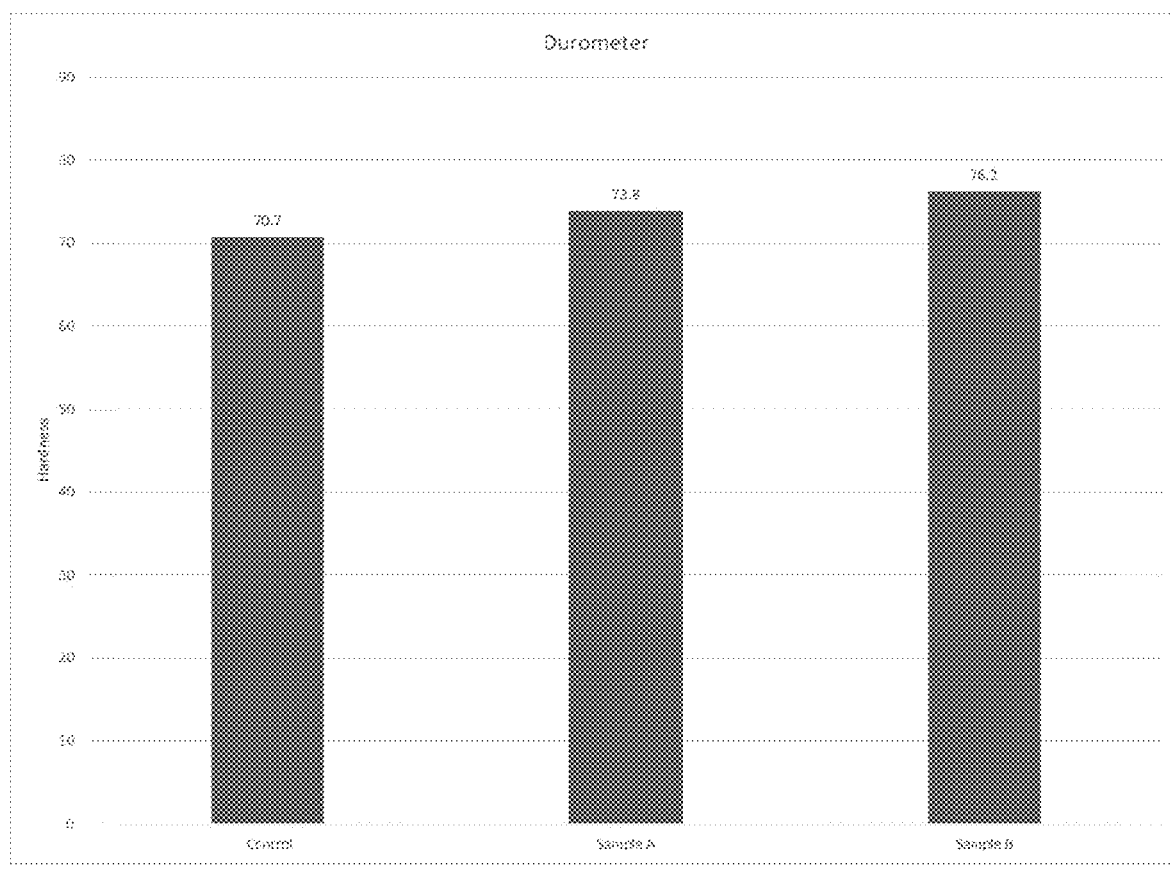
FIG. 3 is a graphical representation of Durometer Hardness (ASTM D2240 Type A).
Figure 4:
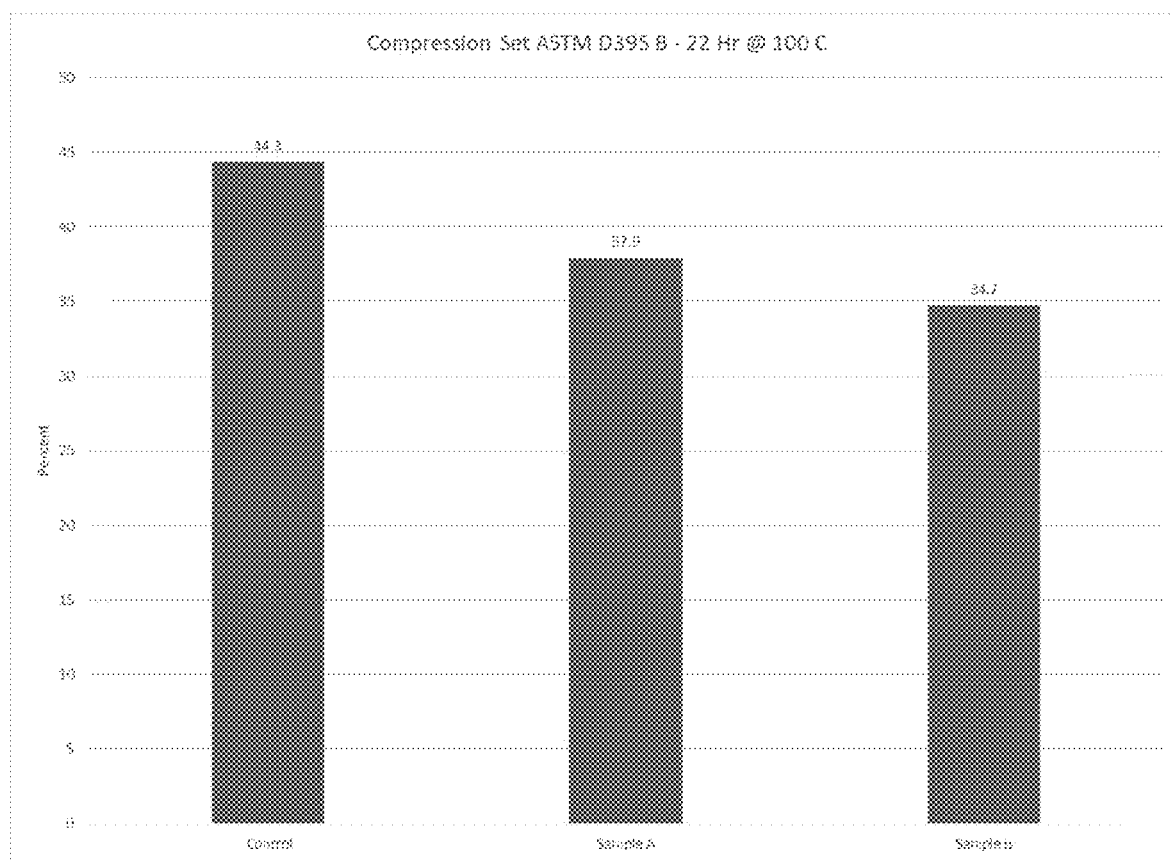
FIG. 4 is a graphical representation of Compression Set (ASTM D395 Method B).

The durometer readings for the three samples, shown in FIG. 3, are similar, but the fiber loaded samples show a slight increase. Compression set (FIG. 4) decreased with the fiber loaded samples. This may be attributed to the change in durometer, not necessarily the fiber loading.

TABLE 3

| Example | Durometer Hardness (Type A) | Tear Die C (KN/M) ASTM D624 | | Compression Set ASTM D395 B | Drum Abrasion ASTM D5963 (grams lost) |
|---|---|---|---|---|---|
| | | with grain | cross grain | | |
| CONTROL | 70.7 | 50.97 | 48.21 | 44.3 | 0.1792 |
| A | 73.8 | 50.51 | 48.57 | 37.9 | 0.1968 |
| B | 76.2 | 50.18 | 52.41 | 34.7 | 0.1711 |

Figure 5:
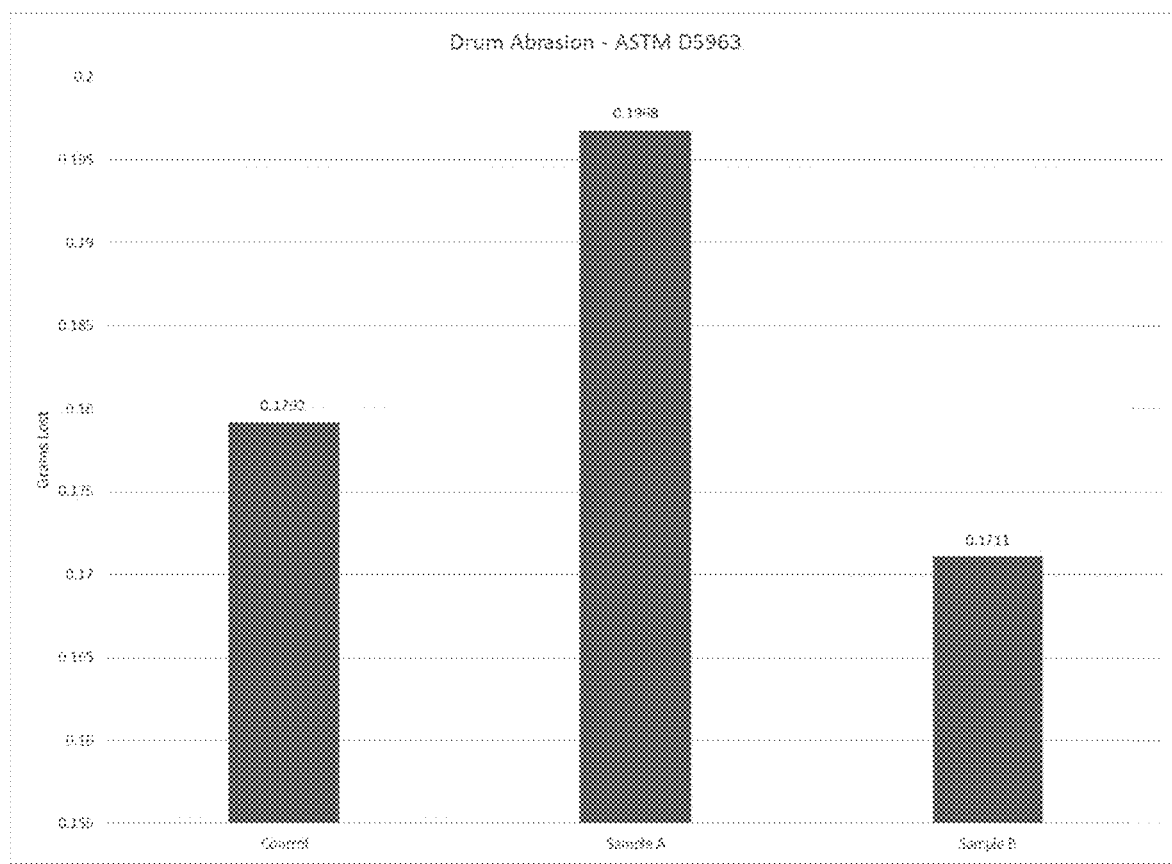
FIG. 5 is a graphical representation of Tear Die C (ASTM D624).

The tear testing was completed parallel to the direction of fiber orientation (FIG. 5). The pelletized fiber blend (sample B) outperformed both the control and unpelletized fiber samples.

Figure 6:
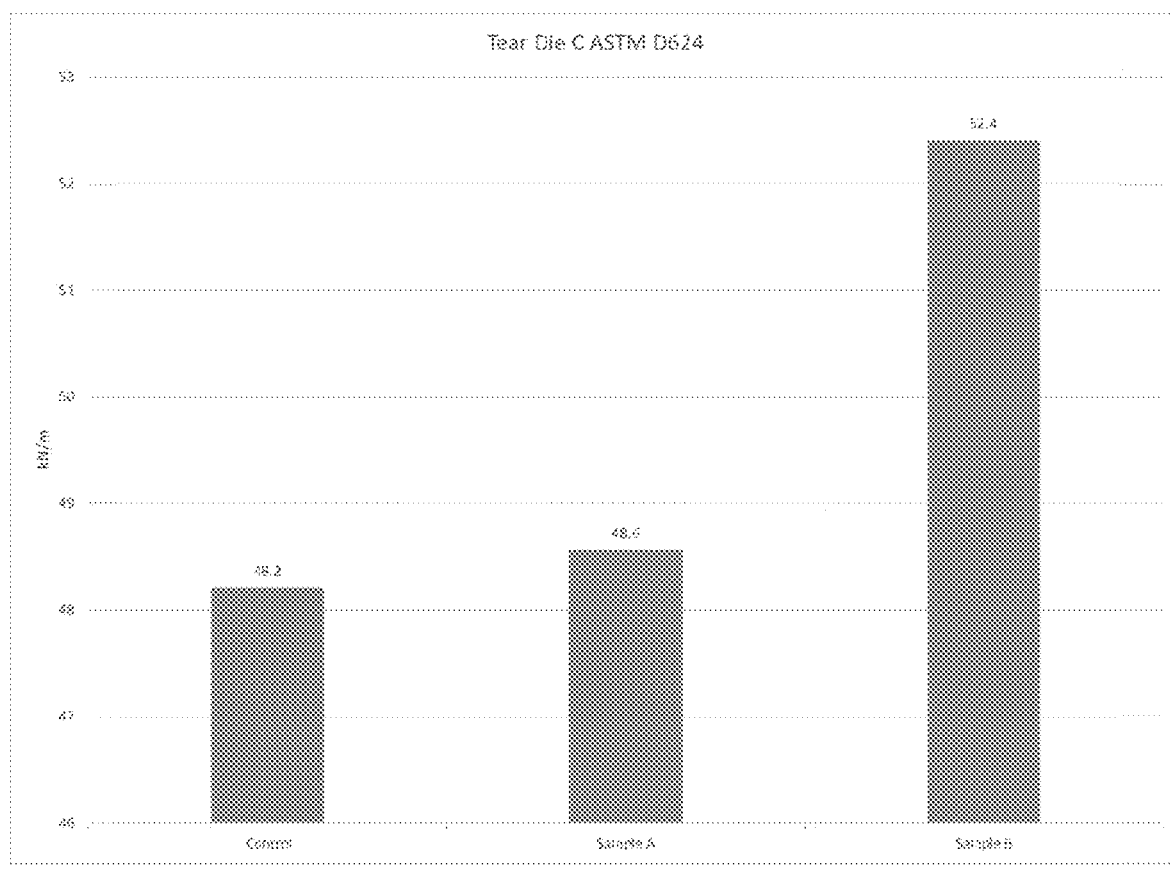
FIG. 6 is a graphical representation of Drum Abrasion—Original (ASTM D5963).

Fiber loaded rubber compounds typically show an improvement to abrasion resistance in field studies. Due to nature of the sample preparation in a lab environment, it can be difficult to get positive results with the drum abrasion test. It is ideal to have the fibers perpendicular to the test surface to show the full benefit. However, the lab samples are prepared such that the fibers are parallel to the test surface which can make it easy to release from the rubber matrix. Even with this constraint, the pelletized fiber blend (sample B) again outperformed both the control and unpelletized fiber samples (FIG. 6).

Figure 7:
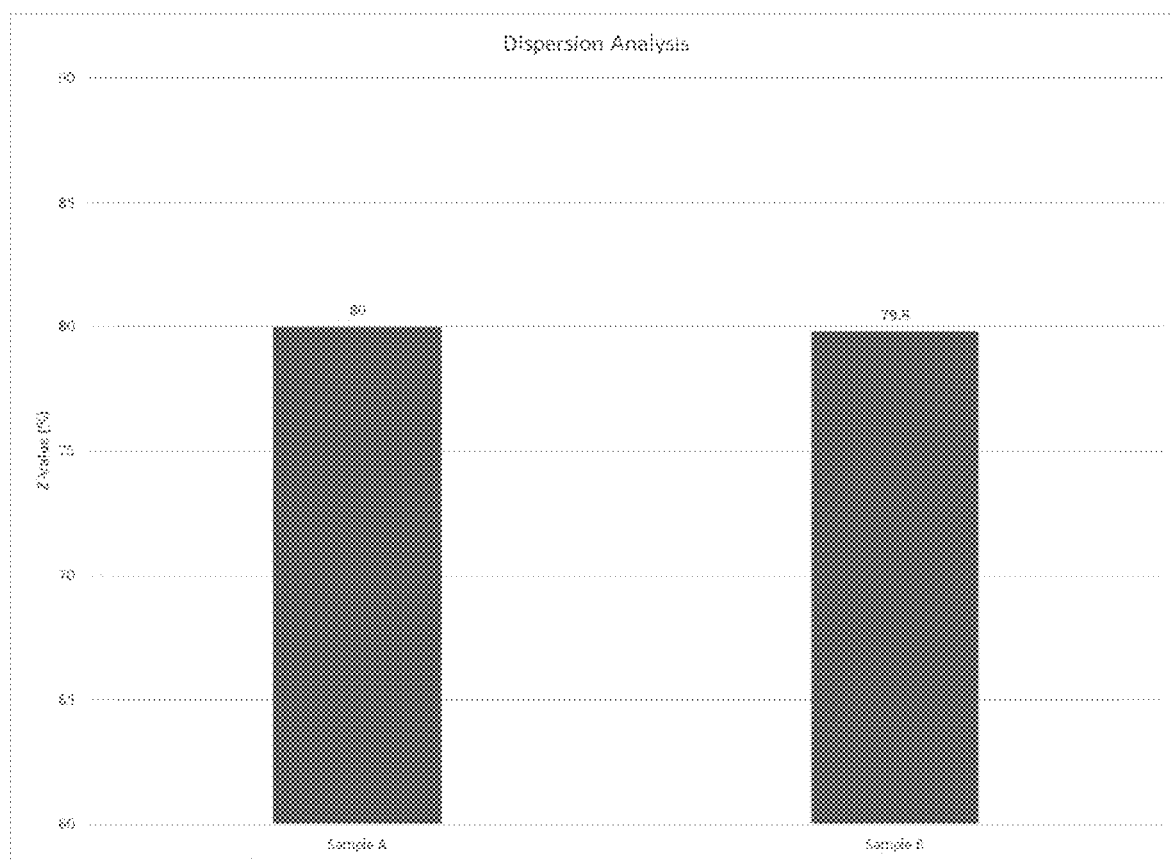
FIG. 7 is a graphical representation of and Dispersion Analysis, as tested by ACE Products and Consulting LLC.

The aramid pulp loaded samples had similar dispersion values when tested by ACE Products and Consulting LLC's test method (FIG. 7).

The present invention provides thermoplastic and rubber polymer composites that can be prepared using pelletized fiber blends according to the present invention, rather than bulk pulp fiber blends, and the properties of the composites will be comparable, or even improved. This is very advantageous because Unpelletized pulp fiber blends have a very low bulk density. Pelletized fiber blends may be characterized by a 10 to 15 times increase in bulk density versus the unpelletized fiber blends. This provides a huge benefit in transportation and storage, and also in the ease of addition in mixing operations.

In one or more embodiments, the yield point in the with grain stress vs. strain curve increases for rubber compositions made using the pelletized fiber blends of the present invention, indicating improved fiber to rubber adhesion. In one or more embodiments, tear strength and abrasion resistance also improve. No negative impact on dispersion is seen when compacting an aramid pulp blend into a pellet form with a binding aid, prior to mixing with a thermoplastic or rubber polymer to form a composite.

Various modifications and alterations that do not depart from the scope and spirit of this invention will become apparent to those skilled in the art. This invention is not to be duly limited to the illustrative embodiments set forth herein.

What is claimed is:

1. A pelletizable fiber blend comprising
a plurality of short fibers including highly-fibrillated short fibers and non-fibrillated short fibers, where the highly-fibrillated short fibers are characterized by a degree of fibrillation of at least about 30 percent, where the highly-fibrillated short fibers have average fiber lengths of from about 0.1 millimeters to about 2.5 millimeters, where the non-fibrillated short fibers have average fiber lengths of from about 50 microns to about 25 millimeters; and
a binder selected from the group consisting of nylon powder, nylon fiber, polybutadiene powder, ethylene-propylene-diene terpolymer (EPDM) rubber powder, styrene-butadiene rubber powder, ethylene-vinyl acetate (EVA) powder, and hexakis(methoxymethyl) melamine (HMMM) resin powder, wherein an amount of the binder is less than about 25 wt. %, based upon a total weight of the pelletizable fiber blend,
wherein the pelletizable fiber blend comprises less than about 1 wt. % wax, based upon the total weight of the pelletizable fiber blend,
wherein the pelletizable fiber blend is capable of being pelletized.

2. The pelletizable fiber blend of claim 1, wherein the highly-fibrillated short fibers are highly-fibrillated aramid short fibers.

3. The pelletizable fiber blend of claim 1, wherein the highly-fibrillated short fibers are highly-fibrillated aramid short fibers having an average length of from about 0.5 mm to about 2.1 mm.

4. The pelletizable fiber blend of claim 1, wherein the amount of the binder is at least 7 wt. % and less than about 25 wt. %, based upon the total weight of the pelletizable fiber blend.

5. The pelletizable fiber blend of claim 1, wherein the non-fibrillated short fibers have an average fiber length of from about 50 microns to about 2,000 microns.

6. The pelletizable fiber blend of claim 1, wherein the non-fibrillated short fibers have an average fiber length of from about 175 microns to about 500 microns, wherein the highly-fibrillated short fibers have an average length of from about 0.65 mm to about 2.0 mm, wherein the highly-fibrillated short fibers are characterized by a degree of fibrillation of at least about 55 percent.

7. A method of preparing a pelletized fiber blend from the pelletizable fiber blend of claim 1, the method comprising
pelletizing the pelletizable fiber blend of claim 1 in a pellet mill to form the pelletized fiber blend.

8. The method of claim 7, further comprising steps of combining one or more polymers and the pelletized fiber blend; and
mixing the one or more polymers and the pelletized fiber blend to form a homogenous polymer composite.

9. The method of claim 7, further comprising steps of combining, in a first mixing stage, ingredients including one or more vulcanizable polymers and the pelletized fiber blend to form a homogenous vulcanizable polymer mixture,
combining the homogenous vulcanizable polymer mixture with ingredients including one or more curatives to form a second vulcanizable polymer mixture, and
at least partially curing the second vulcanizable polymer mixture.

10. A pelletizable fiber blend comprising
a plurality of short fibers having average fiber lengths of from about 50 microns to about 25 millimeters; and
a binder selected from the group consisting of nylon powder, nylon fiber, polybutadiene powder, ethylene-propylene-diene terpolymer (EPDM) rubber powder, styrene-butadiene rubber powder, ethylene-vinyl acetate (EVA) powder, and hexakis(methoxymethyl) melamine (HMMM) resin powder, wherein an amount of the binder is less than about 25 wt. %, based upon a total weight of the pelletizable fiber blend,
wherein the pelletizable fiber blend comprises less than about 1 wt. % wax, based upon the total weight of the pelletizable fiber blend,
wherein the pelletizable fiber blend is capable of being pelletized,
wherein the pelletizable fiber blend further comprises an anti-static agent that is selected from the group consisting of carbon fibers, pyrolytic graphite, and conductive carbon black.

11. The pelletizable fiber blend of claim 10, wherein the anti-static agent is the carbon fibers, and wherein the carbon fibers have an average length of from about 50 microns to about 500 microns.

12. A pelletizable fiber blend comprising
a plurality of short fibers having average fiber lengths of from about 50 microns to about 25 millimeters; and
a binder selected from the group consisting of nylon powder, nylon fiber, polybutadiene powder, ethylene-propylene-diene terpolymer (EPDM) rubber powder, styrene-butadiene rubber powder, ethylene-vinyl acetate (EVA) powder, and hexakis(methoxymethyl) melamine (HMMM) resin powder, wherein an amount of the binder is less than about 25 wt. %, based upon a total weight of the pelletizable fiber blend,
wherein the pelletizable fiber blend comprises less than about 1 wt. % wax, based upon the total weight of the pelletizable fiber blend,
wherein the pelletizable fiber blend is capable of being pelletized,
wherein the pelletizable fiber blend further comprises one or more ingredients selected from the group consisting of silica, pyrolytic graphite, and polytetrafluoroethylene (PTFE), wherein an amount of the silica, if present, is no more than 10 parts by weight per 100 parts by weight of total fiber in the blend (pbw phf), wherein an amount of the pyrolytic graphite, if present, is no more than 5 pbw phf, and wherein an amount of the PTFE, if present, is no more than 50 pbw phf.

13. A pelletizable fiber blend comprising
a plurality of short fibers including highly-fibrillated short fibers and non-fibrillated short fibers, where the highly-fibrillated short fibers are characterized by a degree of fibrillation of at least about 30 percent, where the highly-fibrillated short fibers have average fiber lengths of from about 0.1 millimeters to about 2.5 millimeters, where the non-fibrillated short fibers have average fiber lengths of from about 50 microns to about 25 millimeters; and
a binder selected from the group consisting of nylon powder, nylon fiber, polybutadiene powder, ethylene-propylene-diene terpolymer (EPDM) rubber powder, styrene-butadiene rubber powder, ethylene-vinyl acetate (EVA) powder, and hexakis(methoxymethyl) melamine (HMMM) resin powder, wherein an amount of the binder is at least 5 wt. % and less than 25 wt. %, based upon a total weight of the pelletizable fiber blend,
wherein the pelletizable fiber blend is devoid of wax,
wherein the pelletizable fiber blend is capable of being pelletized.

14. A pelletizable fiber blend comprising
a plurality of short fibers, wherein the plurality of short fibers includes non-fibrillated short fibers having average fiber lengths of from about 50 microns to about 25 millimeters, wherein the plurality of short fibers includes highly-fibrillated aramid short fibers having an average length of from about 0.1 mm to about 2.5 mm, wherein the highly-fibrillated aramid short fibers are characterized by a degree of fibrillation of at least about 30 percent;
a binder selected from thermoplastic powders, thermoplastic fibers, and elastomeric powders, wherein the binder is selected from the group consisting of nylon powder, nylon fiber, polybutadiene powder, ethylene-propylene-diene terpolymer (EPDM) rubber powder, styrene-butadiene rubber powder, ethylene-vinyl acetate (EVA) powder, and hexakis(methoxymethyl) melamine (HMMM) resin powder, wherein an amount of the binder is less than 22 wt. %, based upon a total weight of the pelletizable fiber blend,
wherein the pelletizable fiber blend comprises less than about 1 wt. % wax, based upon the total weight of the pelletizable fiber blend,
wherein the pelletizable fiber blend is capable of being pelletized.

15. The pelletizable fiber blend of claim 14, wherein the pelletizable fiber blend is devoid of wax.

16. The pelletizable fiber blend of claim 14, wherein the non-fibrillated short fibers are aramid fibers having an average fiber length of from about 50 microns to about 2,000 microns.

17. The pelletizable fiber blend of claim 14, wherein the non-fibrillated short fibers are aramid fibers having an average fiber length of from about 175 microns to about 500 microns, wherein the highly-fibrillated aramid short fibers have an average fiber length of from about 0.65 mm to about 2.0 mm, wherein the highly-fibrillated aramid short fibers are characterized by a degree of fibrillation of from about 30 percent to about 90 percent.

\* \* \* \* \*